Sept. 17, 1935.    C. M. BECKETT ET AL    2,014,365
MEANS FOR REGULATING THE OUTPUT OF PRIME
MOVERS OF ELECTRIC GENERATING PLANTS
Filed June 11, 1932    4 Sheets-Sheet 1

INVENTORS:
Charles M. Beckett
and Donald J. Watkins
BY
ATTORNEY

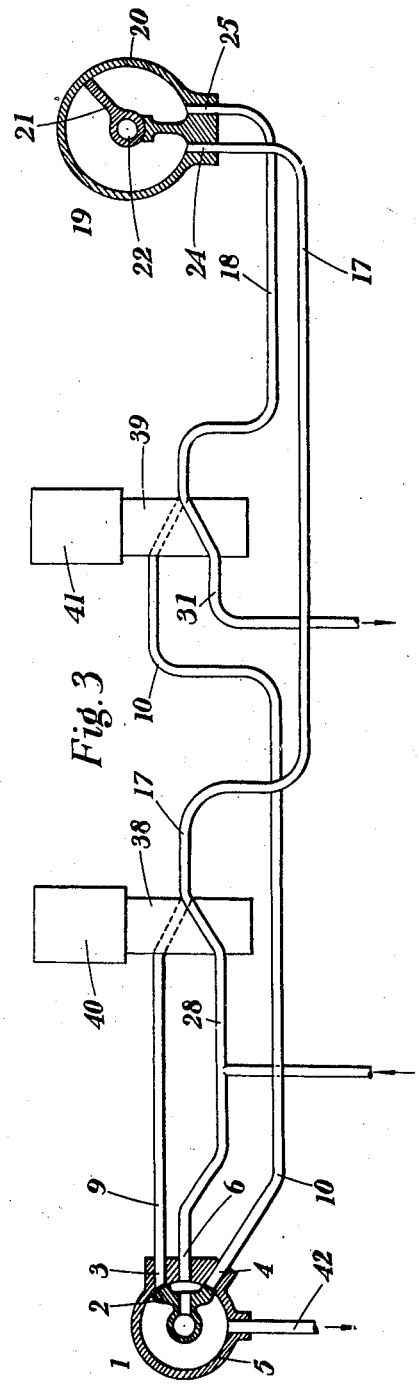
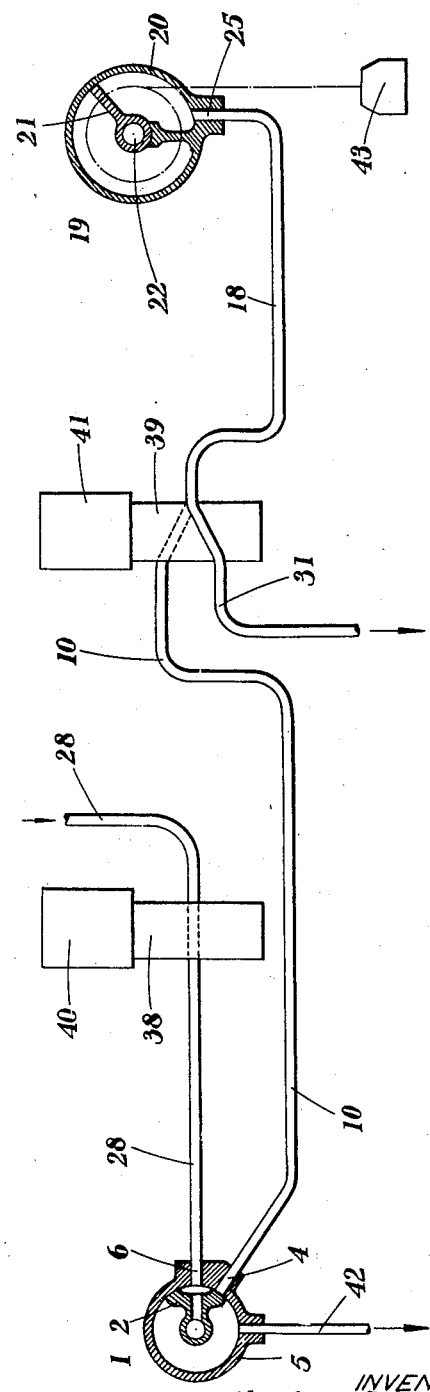
Fig. 3.
Fig. 4.

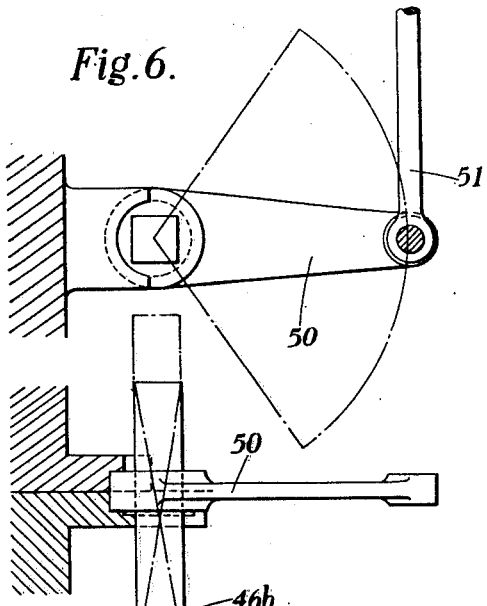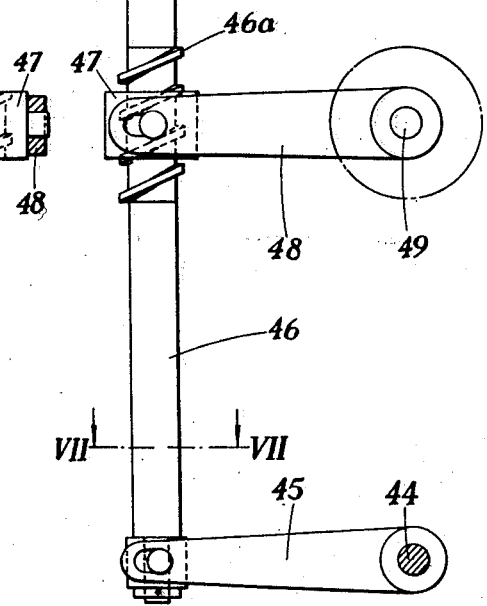

Sept. 17, 1935.  C. M. BECKETT ET AL  2,014,365
MEANS FOR REGULATING THE OUTPUT OF PRIME
MOVERS OF ELECTRIC GENERATING PLANTS
Filed June 11, 1932  4 Sheets-Sheet 4

Inventors.
CHARLES MURRAY BECKETT, DONALD JOHN WATKINS.
By
Attorney.

Patented Sept. 17, 1935

2,014,365

UNITED STATES PATENT OFFICE 2,014,365

MEANS FOR REGULATING THE OUTPUT OF PRIME MOVERS OF ELECTRIC GENERATING PLANTS

Charles Murray Beckett, Cheam, and Donald John Watkins, Streatham, England, assignors to Sir W. G. Armstrong Whitworth and Company (Engineers) Limited, Westminster, London, England, a British company Application June 11, 1932, Serial No. 616,722
In Great Britain June 13, 1931

10 Claims. (Cl. 290—40)

This invention relates to means for regulating the output of prime movers of electric generating plant comprising a substantially constant speed and output prime mover, of the kind in which the means for regulating the field generator is operated by means of a fluid motor in a circuit whose direction of flow is controlled by valve means in accordance with the position of the governor or other tachometrical device of the prime mover.

The object of the invention is to provide non-electric automatic control means of simple construction whereby a prime mover of an electric generating plant may be made to run at a constant torque and in such a manner that a slight tendency of the prime mover to vary its speed owing to varying load adjusts the generator field control means until the generator condition is altered to suit the changed load condition and the effect of the latter removed from the prime mover which as a result again runs at its normal speed with the field control means retained in the new position, so that the said field control means may be retained in any intermediate position between maximum excitation and minimum excitation when the said tachometrical device is in its normal position, and variation of the said field control means results from increase or decrease in prime mover speed irrespective of the position of the said field control means when the increase or decrease in prime mover speed occurs, all with a view to ensuring that the prime mover is not overloaded and yet works at its intended full output for each prearranged setting of the tachometrical device.

By "substantially constant speed and output prime mover" is meant a prime mover which is adapted to be run at a substantially constant speed and output for each setting of the tachometrical device, such settings varying in number according to the application of the plant.

Another object of the invention is to provide means whereby the said automatic means may be cut out or modified at will when the usual control of the power circuit has to be effected.

Another object of the invention is to provide means whereby the setting of the automatic means may be altered at will so that automatic control may be effected from no-load up to full-load.

According to the invention the valve means for controlling the fluid motor circuit is operatively connected to a load sensitive tachometrical device of the prime mover so as to be controlled solely by the said tachometrical device, the said valve being hereinafter referred to as the speed-controlled valve.

By "load sensitive tachometrical device" is meant a device which is speed responsive and load sensitive in that it functions as a result of the reaction of the variation in the load on the generator and so on the prime mover, upon the speed of the prime mover.

For modifying the control by the speed-controlled valve, valve means for effecting manual (as opposed to automatic) control of the fluid motor are inserted in the fluid circuit between the fluid motor and the governor control valve, the said valve means being adapted to cut out, or vary the effect of, the speed-controlled valve on the fluid motor.

The invention is particularly adapted for use with internal combustion electric vehicles in which an internal combustion engine drives an electric generator which supplies current for the traction motors of the vehicle, the conditions of service causing the current taken by the motors to vary from instant to instant.

The invention will now be described with reference to the accompanying drawings which show diagrammatically various examples of regulating means for use in an oil electric power plant in which the prime mover has a fuel control valve mounted on a shaft which is adapted to be oscillated by the engine governor to open or close the said valve.

In the said drawings:

Fig. 3 shows an arrangement wherein two manual control valves are used.

Fig. 4 shows an arrangement wherein two manual control valves are used, but having a fluid motor which tends to return to one position.

Fig. 5 is an elevation of a device for varying the governor control so that automatic control may take place from no-load to full-load.

Fig. 6 is a plan of the upper portion of Fig. 5.

Fig. 7 is a section taken on the line VII—VII of Fig. 5.

Fig. 8 is an elevation of a detail of Fig. 5.

Figure 1:
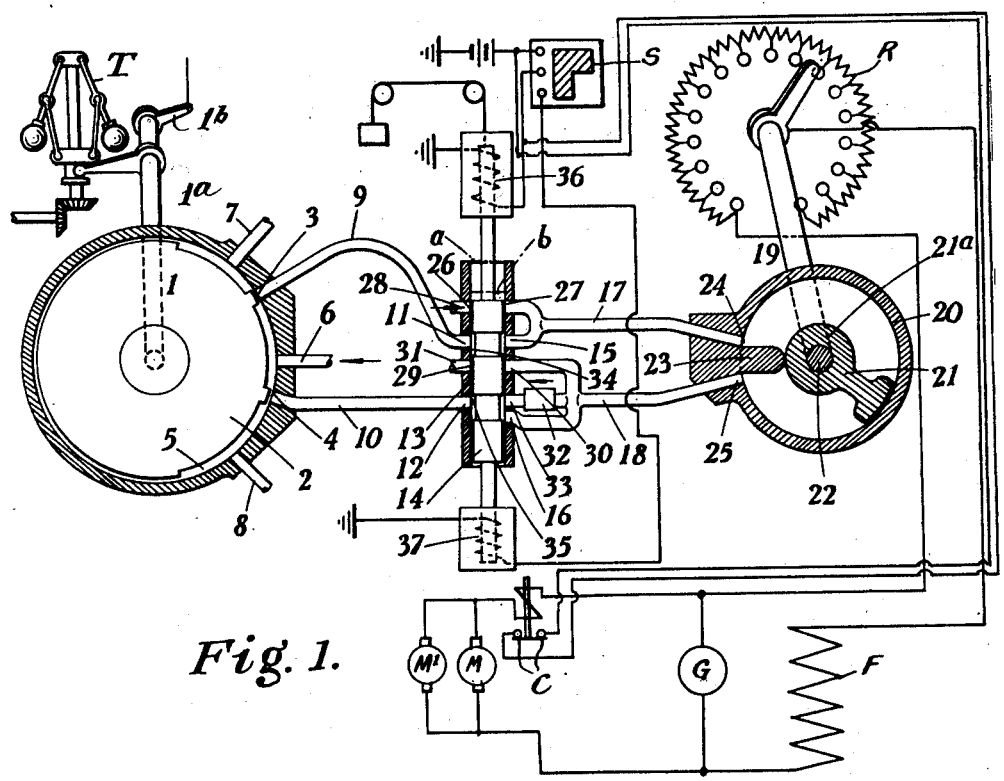
Fig. 1 shows an arrangement wherein a single valve is employed for effecting the manual control of the power circuit.

Referring more particularly to Fig. 1, T is the engine governor, G the generator, F the generator field, R the generator field rheostat, and M, M¹ the motors driven by the generator G. 1 is the speed-controlled valve comprising a valve member 2 keyed on a shaft 1a having thereon an arm 1b connected to the fuel control valve, the said member 2 being adapted to uncover two ports 3, 4 in the valve casing 5, an oil supply port 6 being arranged between the said ports, while oil outlet ports 7, 8 are arranged on the other sides of each of the said ports. The ports 3, 4 are connected by pipes 9, 10 to two ports 11, 12 in a cylindrical valve casing 13 having a piston valve 14 therein, while corresponding ports 15, 16 in the said valve casing are connected by pipes 17, 18 to a fluid motor 19 in the form of a cylindrical casing 20 in which is mounted a radial arm 21 on a shaft 22 in operative communication with the field rheostat of the generator or of an exciter in circuit with the generator field.

The arm 21 extends from a central boss 21a and at its outer end is enlarged so as to offer a substantial constriction between it and the wall of the motor casing. The boss 21a practically touches a partition member 23 in the casing 20 extending inwards from the inner wall thereof. The oil pipes 17, 18 are connected to ports 24, 25 on either side of the partition 23, so that for one direction of flow of the oil the arm 21 will be turned in one direction, and for the other direction of oil flow the arm will be turned in the reverse direction, and the generator field will either be increased or reduced.

For convenience of description the one set of pipes 9 and 17 with their ports is termed the negative side of the fluid circuit, and the other set 10 and 18 with their ports, the positive side, the arrangement being such that when the oil flows along the negative side to the motor 19 the generator field is reduced while when it flows along the positive side to the motor 19 the generator field is increased. In the arrangement described, clockwise turning of the motor 19 reduces the field, and vice versa; while clockwise turning of the fuel valve shaft 1a reduces the fuel admitted to the engine cylinders, and vice versa.

The piston valve casing 13 has two further pairs of ports, one pair 26, 27 of which is on the one hand connected with an oil supply pipe 28 and on the other hand with the negative pipe 17 leading to the fluid motor 19; while the other pair 29, 30 is connected on the one hand with an oil outlet pipe 31, and on the other hand with the positive pipe 18 leading to the fluid motor 19. The pipe 18 also communicates by means of a non-return valve 32 with another port 33 in the valve casing 13 which also coacts with the positive port 12 in the piston valve casing communicating with the positive port 4 in the oil valve casing 5, the non-return valve 32 being such as to prevent flow of oil to the fluid motor 19.

The piston valve 14 has two annular grooves 34, 35 therein, each of which is adapted to control the ports in the negative and positive sides of the fluid circuit so that in one position, indicated by the dotted line a representing the top of the valve 14, and which may be termed the normal position, the oil inlet and outlet ports 26, 27 and 29, 30 are uncovered, and the other ports are closed; in a second position shown in full lines the oil inlet and outlet ports are closed and the other ports open; while in a third position, indicated by the dotted line b the ports 26, 27; 29, 30 are again closed and the other ports opened as in the second position with the exception that of the two positive ports 16 and 33 communicating with the fluid motor, only 33 which communicates through the non-return valve 32 is open.

The operation of the apparatus is as follows:—
When it is required to use full engine power as in normal running the piston valve 14 is moved to the position shown in full lines in which the oil valve casing 5 communicates with the motor 19. When the valve member 2 turns in a clockwise direction so that there is a reduction of fuel the positive port 4 is uncovered, and the oil flows along the positive side of the fluid circuit through pipe 10, ports 12 and 16 in the piston valve casing 14, pipe 18 and port 25 to the motor 19 causing it to turn in a counter clockwise direction, and the field is increased. The load is thus increased so that the engine slows down and the valve member 2 moves in the reverse direction to increase the amount of fuel. At the same time the positive port 4 begins to be closed and the movement of the fluid motor 19 arrested until the said port is entirely closed, when the motor 19 is stopped entirely. Further movement of the valve member 2 opens the negative port 3 in its casing, and oil flows in the reverse direction through pipe 9, ports 11 and 15 in the piston valve casing 14, pipe 17 and port 24 to the motor 19 causing it to move clockwise with the result that the field is reduced.

Figure 2:
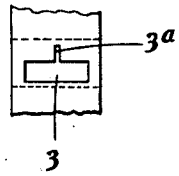
Fig. 2 is a detail view of a port.

In order to prevent excessive movement of the fluid motor 19 at the initial opening of the valve ports 3 and 4, these have a narrow portion as shown at 3a in Fig. 2 which is first uncovered so that only a small flow of oil occurs, and the resulting field adjustment is only slight, this being all that is necessary under normal running conditions, both ports 3, 4 being covered during full load running.

When it is desired to reduce the power the piston valve 14 is moved to the third position as indicated by the dotted line b. In this position the port opens as in the second position with the difference that the port 16 is closed, and the oil can flow only in the positive side of the fluid circuit away from the motor, so that it cannot be moved in a counter clockwise direction to increase the field when the speed-controlled valve moves to reduce the fuel.

To reduce the output to a minimum the piston valve 14 is moved to the first position as indicated at a. This cuts off the fluid motor 19 from the speed-controlled valve and puts it in circuit with the external oil supply circuit through ports 26, 27 and 30, 31 in which the oil flows in the one direction only to move the motor clockwise to its limit of movement and thus reduce the field to a minimum.

The control of the piston valve 14 is conveniently effected by means of two solenoids 36, 37, both of which are energized for moving it to the second position shown in full lines, and the one, 36, for moving it to the third position indicated at b. For the first postion a of minimum output means are provided whereby when neither of the solenoids are engaged the valve moves to this position, for example by gravity operated means. The solenoids 36, 37 are controlled by a solenoid controller S.

During acceleration of the vehicle from rest, it is necessary to prevent the field rheostat moving to a position to give the full engine output as this would produce too high a current in the motors. It is therefore necessary to limit the current to a pre-determined maximum; and this may be done by taking advantage of the solenoid control, and using a current limit relay L which picks up when the main current rises above the pre-determined value closes contacts C in the circuit of the solenoid 36 and thus energizes the solenoid 36 which controls the third position in which oil cannot flow to the fluid motor 19 to increase the field. Once the voltage of this accelerating current has risen sufficiently to put full load on the engine, the control of the fluid motor 19 is taken over by the speed-controlled valve 1, and the current limit relay will not come into action until it is again necessary to start the vehicle from rest.

Referring to Fig. 3 this shows an arrangement wherein the manual valve control comprises two separate fluid valves 38, 39 which are preferably electrically controlled by solenoids 40, 41 as in the arrangement shown in Fig. 1; then instead of having two oil outlets from the governor control valve casing 5, one outlet 42 only is provided as the form of the valve 2 requires one outlet only; finally the non-return valve 32 is dispensed with.

The valves 38 and 39 are shown diagrammatically in two positions, the full lines of the valve passages indicating the fluid circuit when the solenoids 40, 41 are de-energized, and the dotted lines when the said solenoids are energized.

With this arrangement when both the solenoids 40, 41 are de-energized, the fluid pressure drives the motor 19 through the valve 38 in a clockwise direction, thus bringing the rheostat back to its off position and reducing the field current. For automatic working both 40 and 41 are energized and the valve casing 5 is then connected to the motor 19 through both valves 38, 39 and operates the said motor to load up the engine to the load corresponding with the predetermined setting of the valve 2. If the solenoid 40 only is energized the rheostat motor 19 either remains in its existing position or runs back in a clockwise direction, if the engine is overloaded, until the overload is removed.

Fig. 4 shows an alternative arrangement to that shown in Fig. 3. According to this arrangement the fluid supply through pipe 28 is controlled by the valve 38; the valve port 3 and pipes 9 and 17 are dispensed with, the fluid acting on one side only of the motor 19 to drive it in one direction; while the said motor is biased in the other direction by a weight 43 or other suitable biasing mechanism. In this arrangement when the solenoids 40 and 41 are both de-energized the oil supply is cut off and the fluid is driven out of the motor by means of the weight 43 through the valve 39 so that the rheostat runs back to its "off" position. If 40 and 41 are both energized the speed controlled valve 1 controls the motor 19 in exactly the same way as in the arrangement shown in Fig. 3 except that fluid pressure rotates the motor in one direction while in the other direction the biasing mechanism forces the fluid back through the valve 39 and the valve 1. If 40 is de-energized and 41 energized the fluid motor 19 remains stationary or in the event of the engine being overloaded owing to the valve member 2 turning in a counter clockwise direction and so putting the port 4 in communication with the outlet pipe 42, releases fluid and so allows the motor 19 to run back until the overload is removed.

Figs. 5 to 8 show an arrangement for obtaining automatic control for loads other than full load, for example ¼, ½, ¾ and full load settings, in order to give a greater number of power notches on the controller. In this arrangement a governor operated shaft 44 has a lever 45 keyed to it. This lever is connected by block and pin to a vertical spindle 46 which is free to rotate and carries a thread 46a and block 47 engaging therewith. The block 47 drives a lever 48 which is keyed to a shaft 49 of a speed-controlled valve such as the valve 1 in Fig. 1. The spindle 46 is further provided with a suitable extension 46b of square or splined section which is driven by a lever 50. The lever 50 is connected to a control rod 51, movement of which thus rotates the spindle 46 so causing the lever 48 to rock relatively to the governor shaft lever 45, which relative movement thus changes the setting of the oil control valve in relation to the governor.

Where there are a plurality of generating sets, the solenoids controlling the manually controlled valves are connected to a master controller, so that the sets may be simultaneously controlled from a distance.

Figure 9:
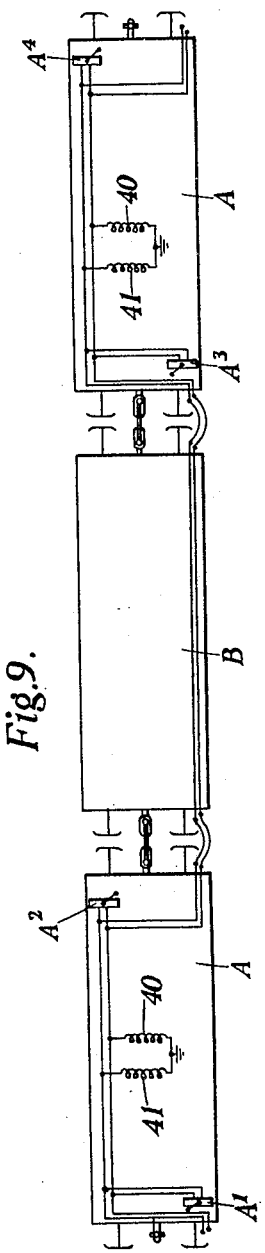
Fig. 9 is a diagrammatic view showing the arrangement of the distant control of the solenoids.
Figure 10:
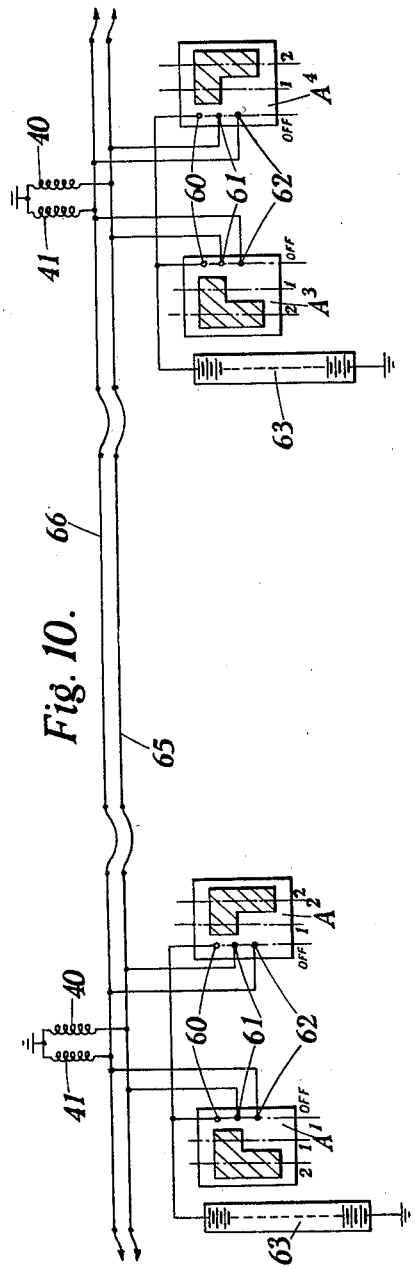
Fig. 10 is a diagrammatic view showing the arrangement on the contacts of the controller for controlling the solenoids.

Figs. 9 and 10 show the wiring arrangements for such distance control, A, A' indicating two power coaches and B a trailer coach, while A¹, A², A³, A⁴ indicate the distance controllers which are in circuit with the solenoids 40, 41 for varying the load at which the automatic control functions. In Fig. 10 only the portions of the controllers for controlling the solenoids 40, 41 are shown with their connections. Three contacts are provided, 60, 61, 62, the first, 60, being connected to a battery 63, the second, 61, to a control wire 65 connected to the solenoids 40, and the third, 62, to a control wire 66 connected to the solenoids 41. Hence in one position both solenoids 40, 41 in each power coach are de-energized, in a second position the solenoids 40 are energized, and in a third position all the solenoids are energized.

The speed-controlled valve mechanism may be a separate entity but in driving connection with the fuel valve shaft or other moving part depending on the speed of the engine; and in such case the fluid circuit operating medium may be any desired fluid such as steam, gas or water, or the circuit may be connected to a vacuum or a source of compressed air.

We claim:

1. A prime mover electric generating plant comprising a substantially constant speed and output prime mover, an electric generator driven thereby, automatic means for regulating the field of said generator, a fluid motor operatively connected to actuate said regulating means, a load sensitive tachometrical device operating in accordance with the speed of the prime mover, and a speed controlled valve so operatively connected with said tachometrical device as to be controlled solely by it, so that at the end of each regulating movement of said tachometrical device, said tachometrical device and speed controlled valve return to their normal settings solely as a result of the reaction of the altered generator condition upon the speed of the prime mover thereby controlling the supply of fluid to said fluid motor in such a way that said field regulating means remains in the position it is in when the speed controlled valve is closed by the return of the tachometrical device to its normal position.

2. A prime mover electric generating plant comprising a prime mover, an electric generator driven thereby, means for regulating the field of said generator, a fluid motor operatively connected to actuate said regulating means, a tachometrical device operating in accordance with the speed of the generator, a speed-controlled valve controlling the supply of fluid to the said motor and so operatively connected to the tachometrical device as to be controlled solely by it, and a valve inserted in the supply to the fluid motor between the latter and the speed-controlled valve.

3. A prime mover electric generating plant comprising a prime mover, an electric generator driven thereby, means for regulating the field of said generator, a fluid motor operatively connected to actuate said regulating means, a tachometrical device operating in accordance with the speed of the generator, a speed-controlled valve controlling the supply of fluid to the said motor and so operatively connected to the tachometrical device as to be controlled solely by it, and means for varying the setting of the speed-controlled valve in relation to that of the tachometrical device.

4. A prime mover electric generating plant comprising a prime mover, an electric generator driven thereby, means for regulating the field of said generator, a fluid motor operatively connected to actuate said regulating means, a tachometrical device operating in accordance with the speed of the generator, a speed-controlled valve controlling the supply of fluid to the said motor and so operatively connected to the tachometrical device as to be controlled solely by it, and means for varying the setting of the speed-controlled valve in relation to that of the tachometrical device, including a pair of co-operating screw-threaded members one of which is operatively connected to the tachometrical device so as to be moved longitudinally by it and the other of which is operatively connected to the speed-controlled valve so that longitudinal movement will operate said valve, and manually operable means for rotating one of said screw-threaded members relatively to the other to alter the relative longitudinal position of said members.

5. A prime mover electric generating plant comprising a prime mover, an electric generator driven thereby, means for regulating the field of said generator, a fluid motor operatively connected to actuate said regulating means, a tachometrical device operating in accordance with the speed of the generator, a speed-controlled valve controlling the supply of fuel to the said motor and so operatively connected to the tachometrical device as to be controlled solely by it, and a solenoid-controlled valve inserted in the supply to the fluid motor between the latter and the speed-controlled valve.

6. A prime mover electric generating plant comprising a prime mover, an electric generator driven thereby, means for regulating the field of said generator, a fluid motor operatively connected to actuate said regulating means and having positive and negative sides to either of which fluid can be supplied to drive the motor in opposite directions, a tachometrical device, a speed-controlled valve so operatively connected with the said tachometrical device as to be controlled solely by it and controlling the supply of fluid to both sides of the fluid motor, and two further valves each adapted to be moved into two control positions and inserted in the supply between the speed-controlled valve and the motor, one in the supply to the positive side of the motor and the other in the supply to the negative side of the motor.

7. A prime mover electric generating plant comprising a prime mover, an electric generator driven thereby, means for regulating the field of said generator, a fluid motor operatively connected to actuate said regulating means and having a fluid supply for driving it in one direction and means for permanently urging it in the opposite direction, a tachometrical device, a speed-controlled valve controlling the supply of fluid to the said motor and so operatively connected with the said tachometrical device as to be controlled solely by it, a valve adapted to control the supply of fluid to the speed-controlled valve, and a valve inserted in the supply between the speed controlled valve and the motor.

8. A prime mover electric generating assembly including a plurality of plants each comprising a prime mover, an electric generator driven thereby, means for regulating the field of said generator, a fluid motor operatively connected to actuate said regulating means, a tachometrical device, a speed-controlled valve controlling the supply of fluid to the said motor and so operatively connected with the said tachometrical device as to be controlled solely by it, and a solenoid-controlled valve between the speed-controlled vave and the fluid motor, the assembly also comprising a master controller arranged to control the solenoid controlled valves of all the plants.

9. A prime mover electric generating plant comprising a prime mover, an electric generator driven thereby, means for regulating the field of said generator, a motor driven by said generator, a fluid motor operatively connected to actuate said regulating means, a tachometrical device operating in accordance with the speed of the generator, a speed-controlled valve so operatively connected with the said tachometrical device as to be controlled solely by it and means for automatically limiting the current in the motor.

10. A prime mover electric generating plant comprising a prime mover, an electric generator driven thereby, means for regulating the field of said governor, a motor driven by said generator, a fluid motor operatively connected to actuate said regulating means, a tachometrical device operating in accordance with the speed of the generator, a speed-controlled valve controlling the supply of fluid to the said motor and so operatively connected to the tachometrical device as to be controlled solely by it, a solenoid-controlled valve inserted in the supply to the fluid motor between the latter and the speed-controlled valve and a current limit relay between the generator and motor adapted to control the solenoid of said solenoid controlled valve.

CHARLES MURRAY BECKETT.
DONALD JOHN WATKINS.